Patented Sept. 22, 1925.

1,554,736

UNITED STATES PATENT OFFICE.

BETHUNE G. KLUGH, OF ANNISTON, ALABAMA, ASSIGNOR TO FEDERAL PHOSPHORUS COMPANY, OF BIRMINGHAM, ALABAMA, A CORPORATION OF ALABAMA.

ELECTRIC SMELTING FURNACE.

Application filed June 10, 1920. Serial No. 387,807.

*To all whom it may concern:*

Be it known that I, BETHUNE G. KLUGH, a citizen of the United States of America, residing at Anniston, in the county of Calhoun and State of Alabama, have invented certain new and useful Improvements in Electric Smelting Furnaces, of which the following is a specification.

This invention relates to an electric furnace, especially adapted to the smelting of natural phosphates with the necessary fluxing, reducing and alloying agents, and for the recovery of phosphoric acid and other valuable products by the controlling and treating of such gases, fumes and other evolved materials, as emanate from such electric smelting operations.

In order that the novelty, usefulness, and necessity to commercial operation of the various features of the furnace described herein may be fully understood, I give below certain fundamental essentials which have been determined in the actual operation of a number of commercial size furnaces over long periods in the smelting of a mixture of natural phosphates, siliceous flux, carbon and iron in the production of ferrophosphorus, and in the recovery of phosphoric acid and other valuable products from the gases and fumes that emanated from said electric smelting operations.

Many electric furnaces have been designed especially for the smelting of natural phosphates, with siliceous flux and carbon reducing agents, but practically all of them have, either wholly or in part, serious fundamental defects when their characteristics are considered as applicable to the conditions governing the action of the above materials under such electric smelting operations.

Those characteristics which I regard as most essential are as follows:

1. The furnace design must admit of construction throughout from refractory material, which will resist high temperatures, the chemical action of phosphoric acid, and the fluxing action of slags involved in operations, and will also withstand expansion and contraction incident to changes of temperature, which occur in the commercial operation of such furnaces. The great difficulty of maintaining a joint of metal to refractory materials, when subjected to high temperatures and chemically active gases and fumes, is well known to all practiced in the operation of furnaces treating such materials; hence it is essential for continuous and commercial operation, that the interior of the furnace should preserve in its construction a continuity of refractory materials construction, and avoid metal, either water or air cooled, in all smelting and high temperature gas conducting sections.

2. The furnace must provide for positive sealing of gases and fumes emanating from its operations, so that they cannot escape into the surrounding atmosphere, through either electrode or charging openings. It is obvious this sealing of gases within the furnace must be performed with the minimum of valves, packing rings, or mechanical devices, since metallic, or special substances, or mechanisms, when subjected to the heat and chemical action about the furnaces soon become unworkable, with resultant delays and losses which render the operation uncommercial.

3. The gases must have free passage from the furnace, as such, with no constriction or impeding, into the gas passage provided for conducting them to the point for their subsequent treatment.

4. The electrodes should be in a vertical position, because extended and exhaustive observation of such operations, as well as authentic precedent of similar or analogous operations, has demonstrated positively that a furnace charge consisting of natural phosphates, siliceous flux and carbon in the proportions required for the electric smelting of such charge has such high electrical resistivity, that practically no current, (within the range of furnace operating voltages) can be passed through the charge as such, and that the electric current for such electric smelting must be applied within the more conductive softened charges and molten slag in the bottom of the furnace. Since said slag, which term is used hereafter to include both the slag proper and the softened charge, i. e., the charge in its intermediate state between solid and fluid condition, changes its elevation within the furnace by its formation and tapping, and since the electrode must be in actual contact with such slag in order to maintain and control a uniform flow of current therein, it is obvious that such control can best be maintained with the electrodes at right angles to the horizontal plane formed by the top surface of the slag, which means a vertical or substantially vertical position for the electrodes.

(b) Furthermore, due to the fact that the electrodes, in the present state of the art respecting their materials and construction, are rather weak and fragile mechanically, and also due to the semiplastic nature of certain zones within the operating furnace for the smelting of materials within described, it is impractical to manipulate, for operation, the electrodes in any substantially inclined or horizontal arrangement without electrode breakage so excessive from the strains developed therein that it would render the operation uncommercial.

(c) The complexity of the mechanical equipment and electrical connections necessary for operating electrodes which project into a furnace of commercial size in substantially vertically inclined or horizontal position, is objectionable on account of the high cost of their maintenance and replacement in service. Vertical electrodes permit the simplest form of suspended holder and electrical connection possible for projecting the electrode through the walls and stock and into the slag.

(d) No practical method of sealing the space between the walls of the furnace and the inclined or horizontal electrode has yet been devised which at the same time provides free movement of the electrode, electrical insulation of such seal, and prevention of exit of gases from within, nor are any materials of construction for such sealing available commercially within the present state of the art of electric smelting.

(e) It is obvious, with electrodes inclined toward a common point within the furnace, that the points of the electrodes will come closer together as they are projected or fed down to follow the slag level. This will make impossible the desired control because as the electrodes are fed down to maintain their contact with the slag in controlling the current flow, they will either join together and produce a dead short circuit, or will produce heavy arcing by their close approach.

(f) When open arcs occur within the furnace a dense fume is evolved composed of lime, silica, iron, and other constituents of the stock which clogs up all gas passages and renders the collection of the phosphorus compounds from the gases impractical, and the operation uncommercial on account of interruptions. With vertically arranged electrodes the axes of their points will remain always equidistant, thus permitting control within such ranges as to prevent the formation of open arcs in the furnace.

5. The stock within the furnace must be of a definite depth from its top surface to the bottom of the furnace, in order to maintain definite zones of chemical action, plastic state, and fusion. When an electric furnace smelting a charge as described is allowed to reduce the depth of its charge sufficiently to permit the stock therein to become abnormally heated, the fume as described in the preceding paragraph is evolved with the results aforesaid. The chemistry or physics of this peculiar fume phenomena is not clearly understood, but it has been observed repeatedly over periods of long operation and duplicated invariably with the recurrence of abnormally low stock depths or under arcing conditions so I consider it to be an established law. This feature alone would, if not prevented, defeat the entire object of commercial operation of the phosphate smelting by an electric furnace as herein considered, and it is, therefore, vital that the construction of the furnace be such that the depth of the charge within the furnace be automatically maintained constant and not subject to responsibility and judgment of workmen.

6. The top surface of the charge should remain quiescent, except for the slowly descending column of the stock as smelted, and the furnace should also be charged so that no stock, upon entering the furnace will fall through the outgoing stream of gases. For, it is essential that no appreciable quantity of dust be entrained in the gases, since its removal is very difficult, especially if the gases be allowed to cool either en masse or upon the surface of cooling pipes or dust chambers. I have found that dust is separated from gases at high temperature with the greatest difficulty, and that, when any portion of the gases becomes cooled against any surface of its conducting apparatus, the reaction between the phosphorus compounds and the dust of any stock composition produces a highly adhesive and cementing substance which quickly clogs up pipes and mains, the removal of which causes delays and expense, which may render the operation prohibitive in cost.

7. The furnace should provide sufficient space immediately above the charge and below the roof, to permit the gases to pass out of the furnace with sufficiently low velocity to settle any incidental dust within the furnace. It is obvious that the exit of the gases at high velocity through restricted passages, will entrain dust particles with the disadvantages described in the preceding paragraph.

8. The furnace should be provided with sufficiently flexible facilities for admitting and controlling the air to complete the combustion of the gases within the furnace immediately above the charge, or to partially burn the gases within the furnace immediately above the charge and partially within an auxiliary combustion chamber outside the furnace proper, or to conduct all the gases out of the furnace, and into subsequent treating equipment, in the reduced state.

The above flexibility is essential to meet the varying conditions of raw materials, and changing specifications for the products, which in turn must meet the varying commercial conditions under which a commercial operation may be conducted.

It is highly desirable that such vents or ports as are required to control the admission of air for such combustion control as above described, be constructed in the simplest possible manner, and with a minimum quantity of metallic connections and mechanical devices which when exposed to the dust, heat and acid atmosphere will shortly become unworkable with incident delays and losses. Moreover, the air vents or ports should be of such size and so distributed that air may be admitted to, as well as distributed as uniformly as possible over, the area of the gas space in order that the combustion may be regular and continuous, thus avoiding spasmodic or explosive conditions.

9. Where a combustion space is provided above the stock in the furnace it is essential to protect the electrodes from exposure to the burning gases which would cause their rapid deterioration and destruction, and the best and most practicable means to thus protect the electrode is to surround it with a column of stock which will continue upwardly through the electrode opening and form the gas seal hereinbefore referred to.

Based upon the foregoing fundamental requirements, I have designed and developed a furnace which embodies all the requisite features heretofore enumerated, and which by actual operation has proven its fulfillment of the same.

My invention in its preferred embodiment is illustrated in the accompanying drawings which form a part of this specification, and in which:—

Similar reference letters refer to similar parts throughout the drawings.

Figure 2:
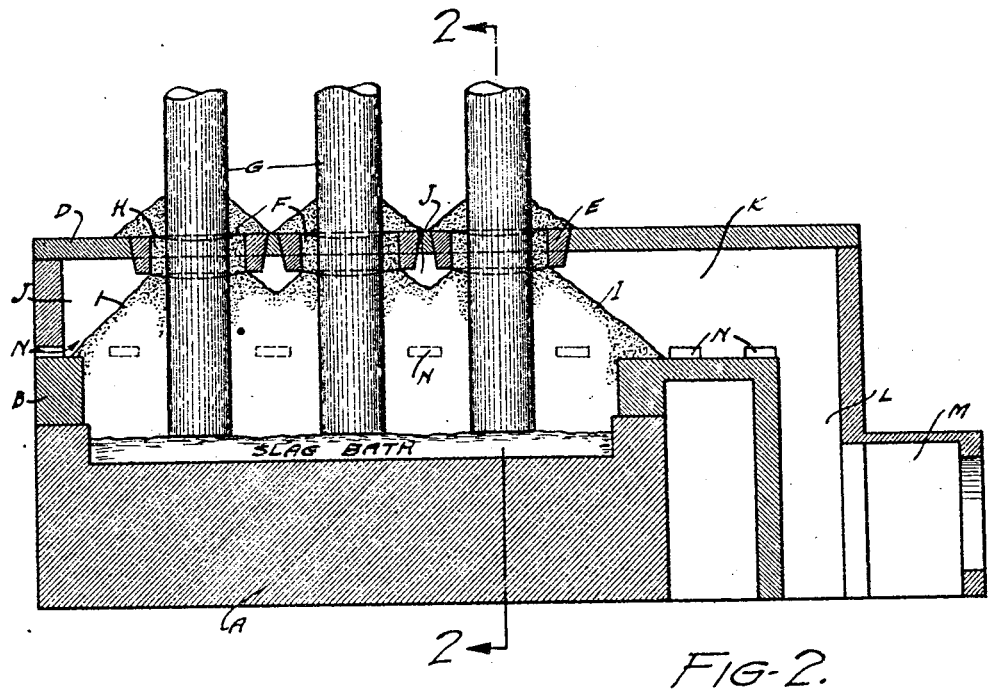
Fig. 2 is a longitudinal vertical section through the furnace.
Figure 1:
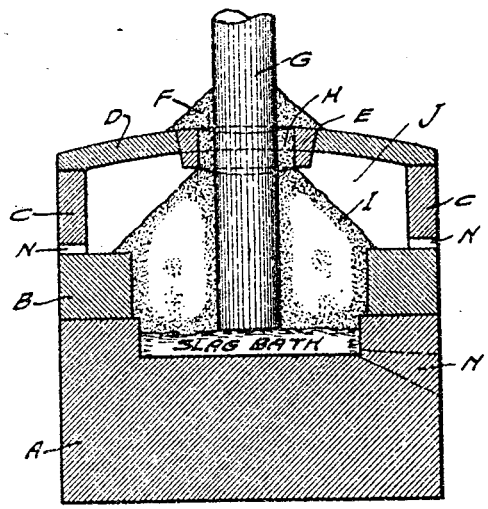
Fig. 1 is a vertical cross section of the furnace through an electrode.

The bottom or hearth A may be constructed of carbon, or other refractory material. The smelting zone walls B are mounted directly upon the crucible walls and are continuous therefrom. The thickness of these walls is continued upward a distance from the furnace bottom or hearth, that has been found in actual practice to be the best operating depth of the stock for a satisfactory reacting zone. The side walls C are in turn mounted upon and are continuous with the smelting zone walls B. The arch D is continuous with the side walls C. The top ring or stock conduit E is built into the arch D, being a continuation of the refractory construction of the entire furnace proper, which, being free from any exposed metal parts, fulfills requirement 1. This top ring or stop conduit E, while built into the arch D forming the roof of the furnace, is removable and replaceable from the exterior of the furnace without disturbing the integrity of the arch.

The opening F within the top ring E, provides a space for the electrode G. The top ring E, further projects down into the furnace interior below the under surface arch D. This provides an annular space or clearance H between the surface of the electrode and the inner surface of the top ring E, ample for charging all the stock into the furnace. When the furnace is filled with stock I, the annular space H will also be filled with the regular stock, and will thus, due to its height of column filling this space, effectively and automatically seal the gases within the furnace from exit through the charging or electrode opening, thus fulfilling requirement 2 by sealing the gases, without the use of mechanical devices, packing rings or other complex apparatus.

The stock I will have the apex of its natural angle of repose at the lowest point of top ring E, which projects substantially into the furnace. This stock I will therefore form a conical or tapered section, and not be projected directly against the side walls or base of arch but will leave ample space or head room J for the gases, as called for by requirements 5 and 7.

The fresh stock as charged into the furnace will essentially, naturally and gradually descend and flow over the top surface of the stock within the furnace, as the smelting proceeds from below, thus the stock as charged into the furnace proper will flow under the outgoing stream of gases which are passing through the combustion chamber, instead of dropping through them, thereby fulfilling requirement 6.

The electrode G is suspended in vertical position thus fulfilling requirement 4.

The longitudinal vertical section through the electrodes of this furnace, shown in Fig. 2, shows how the gases will pass over the stock through the natural passage J through opening K into combustion chamber L and out flue M to subsequent treatment equipment. The ample exit passage provided in this construction fulfills requirement 3. Reduced pressure within this furnace may be maintained by a fan or a stack connected to gas exits, or by sufficiently large mains, conduits and subsequent treating chambers designed for the free egress of gases from the gas combustion chamber in the furnace above the stock with low velocity and a minimum back pressure.

Vents or air ports N are shown through the side walls of the furnace, which vents have their bottom contiguous with the wider top surface of the smelting zone wall B which forms a floor for stock for regulating the size of the port openings. This vent provides for easy access from the outside of the furnace and for purposes of control, the ports being closed with brick or with stock so that the size of the opening is easily regulated. Thus essential requirement 8 is fulfilled.

The furnace described with its combustion chamber above the stock and its arrangements for the stock feed produces an entering and descending column of stock that surrounds and protects the electrode from exposure to the burning gases, thus essential requirement 9 is fulfilled.

When any portion of the electrode is exposed to the gases under the roof of the furnace, the loss of electrode by the erosion and burning of the gases is so great as to render the cost of operation from the electrode item alone, prohibitive. Further, the electrode so heated and decreased in section becomes more resistant to the passage of the current, and thereby increases the current consumption of the operation.

It will readily be seen by reference to the figures that without the projection of the stock conduit through and below the arch at its apex the angle of repose of the stock would bring its top surface so near the under surface of the arch that no appreciable gas space would be left and, by its natural flow, it might lie against the base of arch and make the very simple port hole construction impracticable.

The top ring or stock conduit projecting within the furnace thus provides and functions without metallic or mechanical devices, as an electrode opening, a stock charging opening, a stock column depth regulator, a means for maintaining the requisite gas space and combustion chamber between charge and roof, a gas seal, an electrode protector, and a refractory arch key ring, and it accomplishes all these ends without any mechanical complexity. With the main portions of the furnace constructed and proportioned so as to integrate the above functions, I attain an operative, efficient and automatic electric smelting furnace capable of functioning as described for the purposes set forth.

What I claim as new and desire to secure by Letters Patent, is:—

1. An enclosed electric smelting furnace having a refractory roof formed with a combined stock feed and electrode opening therein, a vertically elongated stock feed conduit set into said opening and supported by said roof and adapted to depend into the furnace in position to impose the load of the entering stock therein upon the stock pile in the furnace, said conduit having sufficient length to cause the entering stock therein to seal the clearance about the electrode passing therethrough, an electrode passing through said conduit and penetrating the stock pile in the furnace, and an eduction conduit for the evolved gases.

2. An enclosed electric smelting furnace having a refractory arched roof supported wholly by its marginal edges from the furnace walls, said roof being formed with a combined stock feed and electrode opening therein, a vertically elongated refractory stock feed conduit set into said opening and supported wholly by said roof and adapted to depend into the furnace in spaced relationship with the said furnace side walls and in position to impose the load of the entering stock therein upon the stock pile in the furnace, said conduit having sufficient length to cause the entering stock therein to seal the clearance about the electrode passing therethrough, an electrode passing through said conduit and penetrating the stock pile in the furnace, and an eduction conduit for the evolved gases.

3. In an enclosed electric smelting furnace having incorporated in its arched roof a stock feed conduit which depends into the furnace in spaced relationship with the side walls of the furnace, an electrode depending through said conduit, an eduction conduit for the evolved gases, said stock feed conduit being disposed and adapted to maintain about the electrode an entering column of stock of sufficient depth to seal the clearance about the electrode against the escape of said gases therethrough.

4. An enclosed electric smelting furnace having spaced refractory stock feed conduits spaced from each other and from the marginal walls of the furnace and projecting downwardly thereinto, each to the predetermined level of the apex of its respective stock pile to be maintained within the furnace, which top level is substantially spaced below the furnace roof to provide an ample surrounding gas chamber above the stock piles, electrodes depending through said conduits and penetrating the stock piles, and an eduction conduit for the evolved gases leading directly from said gas chamber.

5. An enclosed electric smelting furnace having an air inlet and a gas eduction port, and a plurality of stock feeding conduits of refractory material disposed and adapted to preserve a common overhead combustion space between the stock and the roof of the furnace and from which the gas is adapted to be educted through said eduction port.

6. In an enclosed electric smelting furnace, a stock feeding conduit of refractory material disposed and adapted to preserve an overhead combustion space between the stock and the roof of the furnace, a gas eduction conduit, and regulable means to control the volume and distribution of air admitted to said space.

7. In an enclosed electric smelting furnace of the character described, a roof having a series of spaced openings therein, each adapted both for the passage of an electrode and the charging of stock around such electrode, a depending projecting lip surrounding each opening and terminating sufficiently below the roof and so disposed as to insure ample head room forming a single chamber for gases between stock and roof, an eduction conduit for the evolved gases directly communicating with the entire gas space between the stock and roof, and a vertically adjustable electrode adapted to pass centrally through each opening.

8. In an enclosed electric furnace of the character described having a gas outlet, a roof having therein an electrode opening sufficiently larger in cross section than the electrode to permit of charging the stock therethrough, and means to elongate said opening by a replaceable internal refractory projection of the roof adapted to contain a column of stock that rests on the stock in the furnace and that will seal the opening against escape of gases therethrough.

9. An enclosed electric furnace, provided with a stock feed opening through the roof, a vertical electrode suspended through said opening for conducting electric current into said furnace, a gas eduction conduit and a ring of refractory material concentric about the said opening and spaced sufficiently from the electrode to provide a stock charging space around said electrode, said ring of refractory material projecting within the furnace sufficiently below the under surface of the arch so that the stock fed therethrough, in assuming its angle of repose in the furnace, will leave ample space between said stock and the under surface of arch to permit free egress through said conduit of gases emanating from said stock while sealing the space around the electrode against the exit of said gases through said stock feed opening, substantially as described.

10. An electric furnace, constructed continuously of refractory materials including a superimposed and enclosing arch; a suspended and keyed arch ring set in said arch and adapted to project substantially below the under surface of said arch roof, the opening in said arch ring being adapted to form an electrode opening, a stock charging opening, a stock column height control, and, with the stock being fed therethrough, a seal of gases within the furnace; the furnace being further provided with multiplicity of air ports or vents and a gas outlet, and an internal shoulder at the bottom level of said ports adapted to hold furnace stock in position to regulate the area of opening for air admission through said ports.

11. An electric furnace, constructed continuously of refractory materials including a superimposed and enclosing arch, an integral suspended and keyed arch ring which projects substantially below the under surface of said arch roof, the opening in said arch ring providing an electrode opening, a stock charging opening, a stock column height control, and, with the stock being fed therethrough, a seal of gases within the furnace, said furnace being further provided with a multiplicity of air ports so designed and proportioned as to be controllable as to area of opening for air admission by means of regular furnace stock, and a combustion chamber external to and communicating with the upper part of said furnace and having air ports, said air ports providing for selective control of the point of complete combustion of gases either within the furnace proper and above the charge or within chamber, or partially within both, there being an eduction conduit for the gases.

12. An enclosed electric furnace having an air inlet and a gas outlet, a roof having a combined electrode passage and stock feed conduit, and a substantially vertical electrode projecting through said conduit, said parts being relatively arranged and adapted to utilize the stock within and entering the furnace to protect the electrode from any exposure to the burning gases of the furnace.

13. In an enclosed electric furnace having a combustion space above the normal stock level therein, there being an air supply port for said space and an outlet therefrom for the gases, an electrode traversing said combustion space, and means utilizing stock to protect the electrode from exposure to the burning gases in said combustion space.

14. In an electric smelting furnace, a refractory combination of roof, stock feed conduits and electrode passages, and electrodes adapted to contact with the slag bath in the furnace, all disposed and adapted automatically responsive to the demands of the fusion zone to maintain a uniform depth of smelting stock above the slag bath.

15. An enclosed electric furnace, having in combination a roof formed entirely of refractory material and provided with several stock feed conduits therein, said stock feed conduits being each provided for the passage of an electrode therethrough and sufficiently elongated to provide with the entering stock a seal against the gases in said furnace, and having their stock discharge ends disposed in the furnace to produce a gas chamber between the discharged stock within the furnace and the said roof, said gas chamber being intercommunicative in all sections therein.

16. An enclosed electric furnace having a multiplicity of electrodes, each of said electrodes individually projecting through a separate refractory stock feed conduit set into the roof of said furnace and projecting sufficiently below said roof to provide, with the stock fed through said conduits, a continuous chamber between the said stock within the furnace and the roof of said furnace, said chamber being open and communicative about the entire space around said conduits and disposed and adapted for the free passage of the gases throughout said space.

In testimony whereof I affix my signature.

BETHUNE G. KLUGH.